United States Patent
Kim et al.

(10) Patent No.: US 7,283,440 B2
(45) Date of Patent: Oct. 16, 2007

(54) TRACKING ERROR SIGNAL DETECTING METHOD SELECTIVELY USING A PUSH-PULL METHOD, AN IMPROVED PUSH-PULL METHOD, AND A THREE BEAM METHOD AND OPTICAL RECORDING/REPRODUCING APPARATUS USING THE SAME

(75) Inventors: Kun-soo Kim, Seoul (KR); In-wook Hwang, Gyeonggi-do (KR); Pyong-yong Seong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 10/073,061

(22) Filed: Feb. 12, 2002

(65) Prior Publication Data

US 2002/0118611 A1 Aug. 29, 2002

(30) Foreign Application Priority Data

Feb. 23, 2001 (KR) .................................. 2001-9275

(51) Int. Cl.
*G11B 7/00* (2006.01)
(52) U.S. Cl. .............................. 369/44.38; 369/44.11; 369/44.41
(58) Field of Classification Search ............. 369/44.11, 369/44.3, 7–38, 44.37, 44.38, 44.41; *G11B 7/00*, *G11B 5/09, 17/00, 19/00, 20/10, 27/22*
See application file for complete search history.

(56) References Cited

U.S. PATENT DOCUMENTS 4,918,679 A * 4/1990 Opheij et al. ............. 369/44.23

(Continued)

FOREIGN PATENT DOCUMENTS

JP 64-50243 2/1989

(Continued)

OTHER PUBLICATIONS

MAT—(machine assisted translation) of JP 08-221774.*

(Continued)

*Primary Examiner*—A M Psitos
(74) *Attorney, Agent, or Firm*—Staas & Halsey, LLP

(57) ABSTRACT

An optical recording/reproducing apparatus includes an optical pickup and a signal processor. The optical pickup includes an optical splitting device which splits light emitted from a first light source into a main light beam and sub-light beams which are symmetrical with respect to the main light beam and irradiates the split light beams on a recording medium, and a light detection device which receives the main light beam and the sub-light beams reflected by the recording medium, so as to detect a tracking error signal in a three-beam method and one of a push-pull method and an improved push-pull method. The signal processor receives the detection signals output by the light detection device and detects the tracking error signal in the three-beam method and one of the push-pull method and the improved push-pull method, and otherwise selectively detects the tracking error signal in one of the three-beam method, the push-pull method and the improved push-pull method, so as to realize an optimal tracking servo-control. Since a selective use of one of the improved push-pull method, the push-pull method and the three-beam method can be made according to the type of an optical disc, the optimal tracking servo-control can be realized regardless of the depth of a pit in an optical disc during a reproduction of data from the optical disc, such as a non-rewritable optical disc.

52 Claims, 6 Drawing Sheets

U.S. PATENT DOCUMENTS

| | | | |
|---|---|---|---|
| 5,239,529 A * | 8/1993 | Tobita et al. | 369/47.32 |
| 5,708,636 A * | 1/1998 | Takahashi et al. | 369/44.41 |
| 5,742,575 A * | 4/1998 | Yamakawa et al. | 369/53.22 |
| 5,859,819 A * | 1/1999 | Miyabe et al. | 369/44.41 |
| 5,892,744 A * | 4/1999 | Ohba | 369/44.37 |
| 5,963,515 A * | 10/1999 | Shindo | 369/44.23 |
| 6,088,310 A * | 7/2000 | Yanagawa | 369/44.38 |
| 6,218,655 B1 * | 4/2001 | Ogasawara et al. | 250/201.5 |
| 6,222,803 B1 * | 4/2001 | Uemura et al. | 369/44.29 |
| 6,366,543 B2 * | 4/2002 | Uemura et al. | 369/44.29 |
| 6,400,664 B1 * | 6/2002 | Shimano et al. | 369/44.37 |
| 6,424,609 B1 * | 7/2002 | Masakado | 369/53.22 |
| 6,560,019 B2 * | 5/2003 | Nakai | 359/569 |
| 6,567,355 B2 * | 5/2003 | Izumi et al. | 369/44.41 |
| 6,597,642 B1 * | 7/2003 | Ijima et al. | 369/44.11 |
| 6,614,720 B1 * | 9/2003 | Ogata et al. | 369/112.28 |
| 6,868,055 B2 * | 3/2005 | Ueyama et al. | 369/112.15 |
| 6,891,791 B1 * | 5/2005 | Gutin | 369/112.01 |
| 7,116,612 B2 * | 10/2006 | Ogasawara et al. | 369/44.37 |

FOREIGN PATENT DOCUMENTS

| | | | |
|---|---|---|---|
| JP | 64-050243 | | 2/1989 |
| JP | 07-065394 | | 3/1995 |
| JP | 7-65394 | | 3/1995 |
| JP | 07-320287 | * | 8/1995 |
| JP | 08-221774 | | 8/1996 |
| JP | 8-221774 | | 8/1996 |
| JP | 10-149564 | * | 2/1998 |
| JP | 10-149564 | | 6/1998 |
| JP | 11-213405 | | 8/1999 |
| JP | 2000-285482 | | 10/2000 |
| JP | 2000-298871 | | 10/2000 |
| JP | 2000-339718 | | 12/2000 |
| JP | 2000-348367 | | 12/2000 |
| KR | 1999-11987 | | 2/1999 |

OTHER PUBLICATIONS

MAT (Machine assisted translation) of JP 07-320287.*

MAT of JP 10-149564.*

* cited by examiner

TRACKING ERROR SIGNAL DETECTING METHOD SELECTIVELY USING A PUSH-PULL METHOD, AN IMPROVED PUSH-PULL METHOD, AND A THREE BEAM METHOD AND OPTICAL RECORDING/REPRODUCING APPARATUS USING THE SAME

CROSS-REFERENCE TO RELATED APPLICATIONS

This application claims the benefit of Korean Application No. 2001-9275, filed Feb. 23, 2001, in the Korean Industrial Property Office, the disclosure of which is incorporated herein by reference.

BACKGROUND OF THE INVENTION

1. Field of the Invention

The present invention relates to an optical recording/reproducing apparatus which realizes an optimal tracking servo-control according to the type of a recording medium such as an optical disc, and a method of detecting a tracking error signal.

2. Description of the Related Art

In general, a reproducing apparatus performs a tracking servo-control in a three-beam method, and a recording apparatus performs a tracking servo-control in a push-pull method, in particular, in a differential push-pull (DPP) method which is an improved push-pull method. Both the three-beam method and the DPP method utilize beams diffracted to the $0^{th}$ and $\pm 1^{st}$ orders by a grating.

In a reproducing apparatus using the three-beam method, a grating in which the ratio in effectiveness of diffraction between the $0^{th}$ and $\pm 1^{st}$ order beams is about 4:1 through 5:1. That is, the ratio of ($0^{th}$ order:$\pm 1^{st}$ order)=(4:1) through (5:1) is adopted according to the intensity of a beam during a reproduction. The difference in phase between the $\pm 1^{st}$ order beam and $-1^{st}$ order beam irradiated on an optical disc is set to be 180°.

FIG. 1 shows a six-section photodetector 10 of a conventional reproducing apparatus. The six-section photodetector 10 includes a main photodetector 11 having a four-section structure and a pair of sub-photodetector 13 and 15 arranged at corresponding sides of the main photodetector 11. The tracking servo-control is realized in the three-beam method by detecting three beams diffracted by a grating. Here, a tracking error signal detected in the three-beam method is a differential signal between detection signals of the sub-photodetectors 13 and 15.

In a recording apparatus using the DPP method, a grating in which the ratio in effectiveness of diffraction between the $0^{th}$ and $\pm 1^{st}$ order beams of about 10:1 through 15:1 is adopted to increase the efficiency of the $0^{th}$ order beam used for a recording. The difference in phase between the $+1^{st}$ order beam and $-1^{st}$ order beam irradiated on an optical disc is set to be 360°.

FIG. 2 shows an eight-section photodetector 20 of a conventional recording apparatus. The eight-section photodetector 20 includes a main photodetector 21 having a four-section structure and a pair of two-section sub-photodetector 23 and 25 arranged at corresponding sides of the main photodetector 21. The tracking servo-control is realized in the DPP method by detecting three beams diffracted by a grating. Here, a tracking error signal detected in the DPP method is the difference between a sum signal of detection signals of sections I1 and J1 of the sub-photodetectors 23 and 25 and a sum signal of detection signals of sections I2 and J2 of the sub-photodetectors 23 and 25.

The tracking error signals detected in the three-beam method and the DPP method have a different magnitude according to the depth of a pit in an optical disc. FIG. 3 shows that the magnitude of a tracking error signal ($TES_{3\text{-}BEAM}$) in the three-beam method becomes maximum as the depth of a pit of an optical disc is $\lambda/4$. In contrast, the magnitude of a tracking error signal ($TES_{DPP}$) in the DPP method becomes maximum as the depth of a pit of an optical disc is $\lambda/8$, while the magnitude becomes minimum as the depth of a pit of an optical disc is $\lambda/4$.

Therefore, the depth of a pit of an optical disc is standardized to an intermediate value, for example $\lambda/5$, so as to realize the tracking servo-control for any one of the above servo-control methods adopted.

However, many of the optical discs currently being sold are manufactured so as to have a pit depth of closer to $\lambda/4$ which is deeper than the standardized size. As data is reproduced from an optical disc having deeper pits than the standardized size, the magnitude of a tracking error signal detected by a reproducing apparatus using the three-beam method is large whereas the magnitude of a tracking error signal detected by a reproducing apparatus using the DPP method is close to 0. Accordingly, the tracking servo-control itself becomes impossible.

SUMMARY OF THE INVENTION

Accordingly, it is an object of the present invention to provide an optical recording/reproducing apparatus, and a method of detecting a tracking error signal, which can realize an optimal tracking servo-control regardless of the depth of a pit during a reproduction of data from an optical disc including a non-rewritable optical disc, by changing a tracking servo-control method according to the type of the optical disc.

Additional objects and advantages of the invention will be set forth in part in the description which follows and, in part, will be obvious from the description, or may be learned by practice of the invention.

To achieve the above and other objects of the present invention, there is provided an optical recording/reproducing apparatus comprising an optical pickup and a signal processor. The optical pickup includes an optical splitting device which splits light emitted from a first light source into a main light beam and at least two sub-light beams which are symmetrical with respect to the main light beam and irradiates the split light beams on a recording medium, and a light detection device which receives the main light beam and the sub-light beams reflected by the recording medium, so as to detect a tracking error signal in a three-beam method and in one of a push-pull method and an improved push-pull method. The signal processor receives detection signals output by the light detection device and detects the tracking error signal in the three-beam method and in one of the push-pull method and the improved push-pull method, and otherwise detects the tracking error signal by selectively using one of the three-beam method, the push-pull method, and the improved push-pull method, so as to realize an optimal tracking servo-control.

According to an aspect of the present invention, the tracking servo-control is realized by using the tracking error signal in the three-beam method where the recording medium comprises a predetermined reproduction only recording medium, and using the tracking error signal in one of the push-pull method and the improved push-pull method where the recording medium comprises a predetermined recording medium which can be recorded on at least once, according to a recording medium type signal detected by the optical recording/reproducing apparatus.

According to another aspect of the present invention, the optical splitting device splits the light emitted from the first light source into the main light beam and at least four sub-light beams which are symmetrical with respect to the main light beam, and the signal processor comprises a first detection portion which detects the tracking error signal in the three-beam method from first detection signals with respect to two sub-light beams which are closest to the main light beam, and a second detection portion which detects the tracking error signal in the improved push-pull method from second detection signals with respect to other two sub-light beams and main detection signals with respect to the main light beam.

According to yet another aspect of the present invention, the signal processor further comprises a switch which is installed one of between the light detection device and the first and second detection portions, and at output terminals of the first and second detection portions, and a controller which controls the switch by using the recording medium type signal so as to detect the tracking error signal with one of the first and second detection portions.

According to still another aspect of the present invention, the light detection device comprises a main photodetector which detects the main light beam, first sub-photodetectors which receive corresponding ones of the two sub-light beams which are closest to the main light beam, and second sub-photodetectors which receive corresponding ones of the other two sub-light beams which are farther away from the main light beam than the two sub-light beams.

According to still yet another aspect of the present invention, the main photodetector comprises a structure having at least two sections and each of the second sub-photodetectors comprises a structure having one of two and four sections.

According to an additional aspect of the present invention, the optical recording/reproducing apparatus further comprises a light detection device circuit including a current-to-voltage converting unit which converts a current signal output from the main photodetector and the first and second sub-photodetectors into a voltage signal and outputs the converted voltage signal, and a switch which selectively outputs each of the detection signals from a corresponding one the first and second sub-photodetectors.

According to yet additional aspect of the present invention, the optical splitting device comprises a diffracting device which diffracts the light emitted from the light source into $0^{th}$ order, $\pm 1^{st}$ order, and $\pm 2^{nd}$ order diffracted light beams.

According to still additional aspect of the present invention, the diffracting device performs diffraction so as to have a diffraction ratio between the $0^{th}$ order, the $\pm 1^{st}$ order, and the $\pm 2^{nd}$ order diffracted light beams that is substantially 8-16:0.3-2.3:0.3-2.3, and a total diffraction efficiency of the $0^{th}$ order, the $\pm 1^{st}$ order, and the $\pm 2^{nd}$ order diffracted light beams with respect to an incident light beam of at least 70%.

According to still yet additional aspect of the present invention, the optical splitting device splits the light beam emitted from the first light source into the main light beam and at least two sub-light beams which are symmetrical with respect to the main light beam, and the signal processor comprises a first detection portion which detects the tracking error signal in the push-pull method by using first detection signals with respect to the main light beam, and a second detection portion which detects the tracking error signal in the three-beam method by using second detection signals with respect to two sub-light beams which are symmetrical with respect to the main light beam.

According to another additional aspect of the present invention, the signal processor further comprises a switch installed at output terminals of the first and second detection portions, and a controller which control the switch by using the recording medium type signal so as to selectively output the tracking error signal from one of the first and second detection portions.

According to a further aspect of the present invention, the light detection device comprises a main photodetector which detects the main light beam and sub-photodetectors which receives corresponding ones of the two sub-light beams, wherein the main photodetector comprises a structure having at least two sections.

To achieve the above and other objects of the present invention, there is provided a method of detecting a tracking error signal in an optical recording/reproducing apparatus, the method comprising splitting light emitted from a light source into a main light beam and at least two sub-light beams which are symmetrical with respect to the main light beam and having the split light beams irradiated on a recording medium, detecting the main light beam and the sub-light beams reflected by the recording medium, and detecting the tracking error signal by using detection signals of the main light beam and/or the sub-light beams in a three-beam method and one of a push-pull method and an improved push-pull method, and otherwise in one of the three-beam method, the push-pull method, and the improved push-pull method.

According to still another additional aspect of the present invention, the detecting of the tracking error signal comprises selecting a tracking servo-control method including one of the three-beam method, the push-pull method and the improved push-pull method according to a recording medium type signal detected by the optical recording/reproducing apparatus, and detecting the tracking error signal according to the selected servo-control method.

According to yet another additional aspect of the present invention, the detecting of the tracking error signal comprises using the recording medium type signal detected by the optical recording/reproducing apparatus, and detecting the tracking error signal in the three-beam method where the recording medium comprises a predetermined reproduction only recording medium, and in one of the push-pull method and the improved push-pull method where the recording medium comprises a predetermined recording medium which can be recorded on at least once.

BRIEF DESCRIPTION OF THE DRAWINGS

The above and other objects and advantages of the present invention will become more apparent and more readily appreciated by describing in detail preferred embodiments thereof with reference to the accompanying drawings in which.

DETAILED DESCRIPTION OF THE PREFERRED EMBODIMENTS

Figure 1:
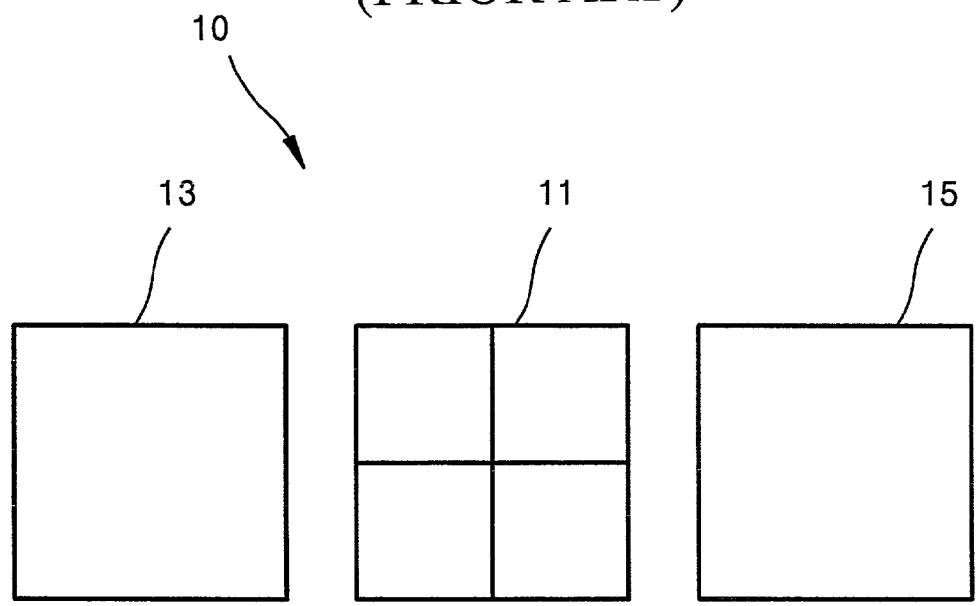
FIG. 1 is a plan view showing a six-section photodetector adopted in a conventional reproducing apparatus.
Figure 2:
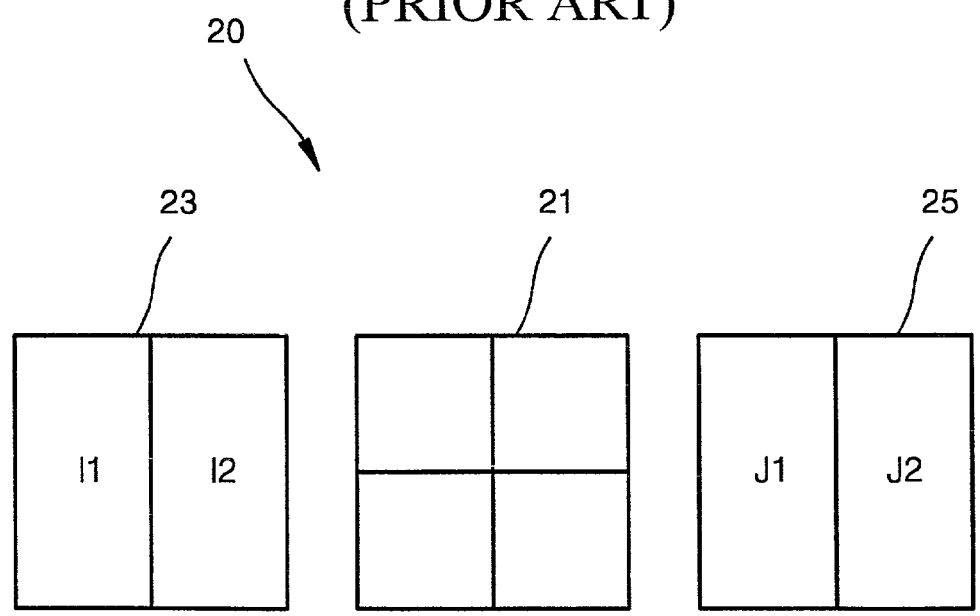
FIG. 2 is a plan view showing a eight-section photodetector adopted in the conventional recording apparatus.
Figure 3:
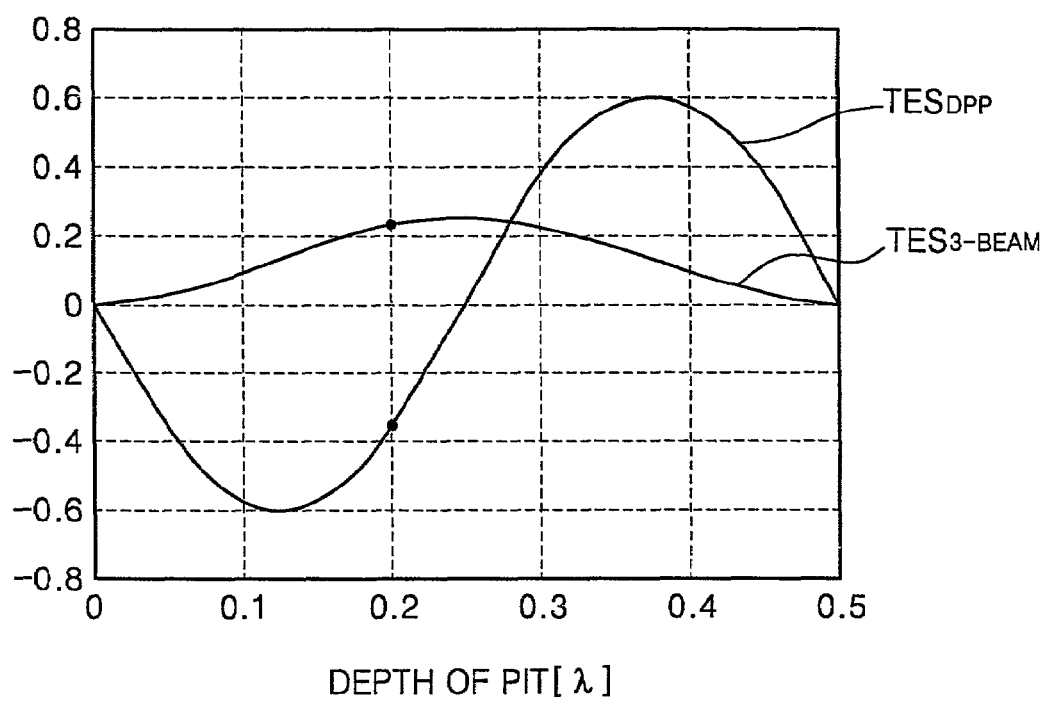
FIG. 3 is a graph of a tracking error signal with respect to the depth of a pit of an optical disc according to the three-beam method of FIG. 1 and the improved push-pull method of FIG. 2.

Reference will now be made in detail to the present preferred embodiments of the present invention, examples of which are illustrated in the accompanying drawings, wherein like reference numerals refer to like elements throughout.

The present invention is characterized in that a tracking servo-control is performed in a three beam method where an optical disc for reproduction such as a CD-ROM is inserted and in one of a push-pull method and an improved push-pull method as an optical disc for recording such as a CD-R/RW and/or DVD-RAM is inserted, by using a feature where the type of an optical disc is discriminated where the optical disc is first inserted into an optical recording/reproducing apparatus of the present invention. By adopting the above-mentioned invention, an optical pickup for a recording apparatus can stably realize the tracking servo-control regardless of the depth of a pit of an optical disc for reproduction.

Figure 4:
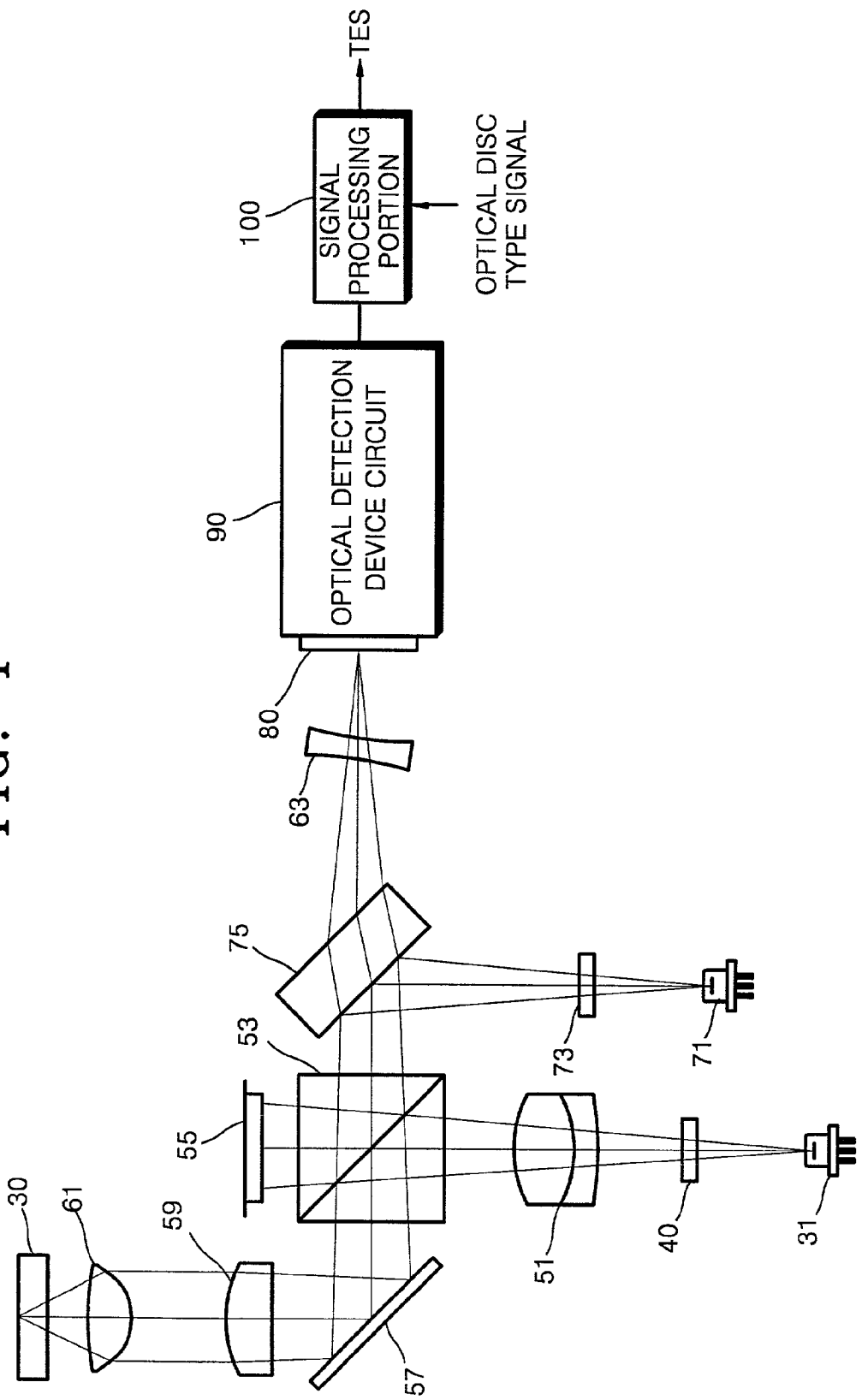
FIG. 4 is a view schematically showing the structure of an optical recording/reproducing apparatus system according to the present invention.

FIG. 4 shows an example of an optical recording/reproducing apparatus system according to the present invention. The optical recording/reproducing apparatus includes a signal processor 100 and an optical pickup which irradiates a main light beam to a main track of an optical disc 30 and at least four sub-light beams symmetrical with respect to the main light beam. The optical pick up also receives and detects the main and sub-light beams reflected by the optical disc 30. The signal processor 100 selectively detects a tracking error signal in one of an improved push-pull method and a three-beam method by using detection signals of the main light beam and the sub-light beams.

The optical pickup includes a first light source 31, an optical splitting device 40 which splits a light beam emitted from the first light source 31 into the main light beam and at least four sub-light beams which are symmetrical with respect to the main light beam, an optical system which guides the light beams split by the optical splitting device 40 to land on the optical disc 30, and a light detection device 80 which receives the main light beam and the sub-light beams reflected by the optical disc 30.

A diffraction device, for example, a grating, which splits the light beam emitted from the first light source 31 into at least five light beams by diffracting the light beam emitted from the first light source 31 into $0^{th}$ order, $\pm 1^{st}$ order, the $\pm 2^{nd}$ order, etc., light beams, is provided as the optical splitting device 40. Here, the $0^{th}$ order light beam becomes the main light beam, the $\pm 1^{st}$ order light beams become two first sub-light beams relatively close to the main light beam, and the $\pm 2^{nd}$ order light beams become two second sub-light beams relatively far from the main light beam.

According to an aspect of the present invention, a holographic device may be provided as the optical splitting device 40.

The optical splitting device 40 diffracts the light beam emitted from the first light source 31 into the $0^{th}$ order light beam, the $\pm 1^{st}$ order light beams, and the $\pm 2^{nd}$ order light beams at a diffraction ratio of about 8-16:0.3-2.3:0.3-2.3, so as to achieve the total efficiency of diffraction into the $0^{th}$ order light beam, the $\pm 1^{st}$ order light beams, and the $\pm 2^{nd}$ order light beams with respect to the incident light beam of at least 70%.

According to another aspect of the present invention, the optical splitting device 40 diffracts the light beam emitted from the light source 31 into the $0^{th}$ order, $\pm 1$st order, and $\pm 2$nd order light beams at a diffraction ratio of about 14:0.5:1, so as to achieve the total efficiency of diffraction into the $0^{th}$ order, $\pm 1$st order and $\pm 2$nd order light beams with respect to the incident light beam of at least 90%.

Figure 5:
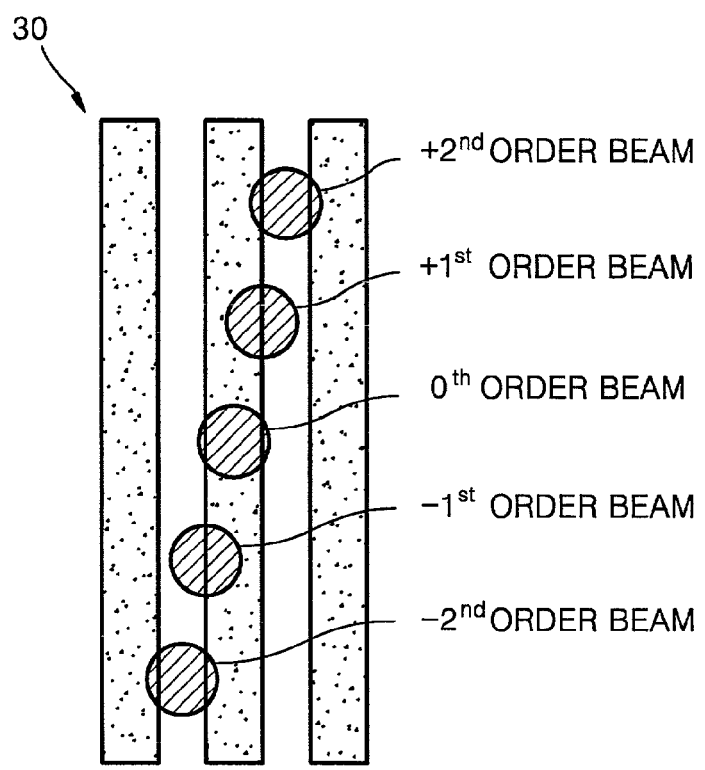
FIG. 5 is a view schematically showing diffracted beams irradiated on the optical disc of FIG. 4.

FIG. 5 shows the diffracted light beams irradiated on the optical disc 30. The pitch of the optical splitting device 40 and the structure of the optical system are arranged so as to diffract the light beams on a surface of the optical disc 30 as shown in FIG. 5. A difference in phase of 180° is generated between the $\pm 1^{st}$ order beam and the $-1^{st}$ order beam and a difference in phase of 360° is generated between the $+2^{nd}$ order beam and $-2^{nd}$ order beam as the light beam diffracted by the optical splitting device 40 is irradiated onto the optical disc 30. Accordingly, with the above phase differences, the $\pm 2^{nd}$ order beams can be used to detect a tracking error signal in the improved push-pull method while the $\pm 1^{st}$ order beams can be used to detect a tracking error signal in the three-beam method. Therefore, a tracking servo-control method can be selectively changed.

Figure 6:
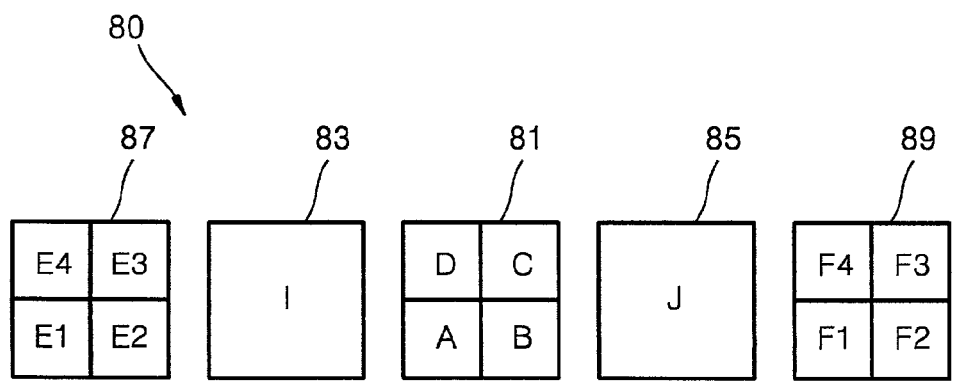
FIG. 6 is a view showing a photodetector device adopted in an optical recording/reproducing apparatus according to an embodiment of the present invention.

FIG. 6 shows a light detection device 80 adopted in an optical recording/reproducing apparatus according to an embodiment of the present invention. The light detection device 80 performs an optimal tracking servo-control according to the depth of a pit formed in the optical disc 30 by detecting the above diffracted beams. The light detection device 80 includes a main photodetector 81 which receives the $0^{th}$ order beam, first sub-photodetectors 83 and 85 which receive corresponding ones of the $\pm 1^{st}$ order beams, and second sub-photodetectors 87 and 89 which receive corresponding ones of the $\pm 2^{nd}$ order beams.

According to yet another aspect of the present invention, the main photodetector 81 comprises at least a two-section structure, for example, a four-section structure, so as to detect a focus error signal in an astigmatism method. Each of the second sub-photodetectors 87 and 89 comprises at least a two-section structure so as to detect a tracking error signal in the improved push-pull method.

In this case, each of the second sub-photodetectors 87 and 89 comprises a four-section structure so as to reproduce data recorded on a DVD-RAM. Accordingly, a focus error signal can be detected in an improved astigmatism method during a reproduction of data recorded on a DVD-RAM.

FIG. 6 shows the light detection device 80 which includes the main photodetector 81 having the four-section structure A, B, C and D, the first sub-photodetectors 83 and 85 having a structure I and J, and each of the second sub-photodetectors 87 and 89 having the four-section structures E1, E2, E3 and E4, and F1, F2, F3 and F4, respectively. Detection signals therefrom are indicated by the same references. In such a case, tracking error signals $TES_{3\text{-}BEAM}$ and $TES_{DPP}$ in the three-beam method and the improved push-pull method, and a focus error signal d-FES in the improved astigmatism method (differential astigmatism method) are expressed as shown in Equations 1.

Equations 1:

$TES_{3\text{-}BEAM} = I - J$ $TES_{DPP} = ((A+D)-(B+C))-k(\{(E1+F1)+(E4+F4)\}-\{(E2+F2)+(E3+F3)\})$ $d\text{-}FES = ((A+C)-(B+D))-k'(\{(E1+F1)+(E3+F3)\}-\{(E2+F2)+(E4+F4)\})$   Equation 1

Here, k is a gain applied to the detection signals of the second sub-photodetectors 87 and 89 so as to detect an optimal tracking error signal in the improved push-pull method. Also, k' is a gain applied to the detection signals of the second sub-photodetectors 87 and 89 so that an optimal focusing error signal can be detected in the improved astigmatism method. In Equations 1, a sign of each detection signal from the respective sections and the first sub-photodetectors 83 and 85 indicates a current signal or a current-to-voltage converted signal output from each section of the main photodetector 81, the second sub-photodetectors 87 and 89, and the first sub-photodetectors 83 and 85.

Figure 7:
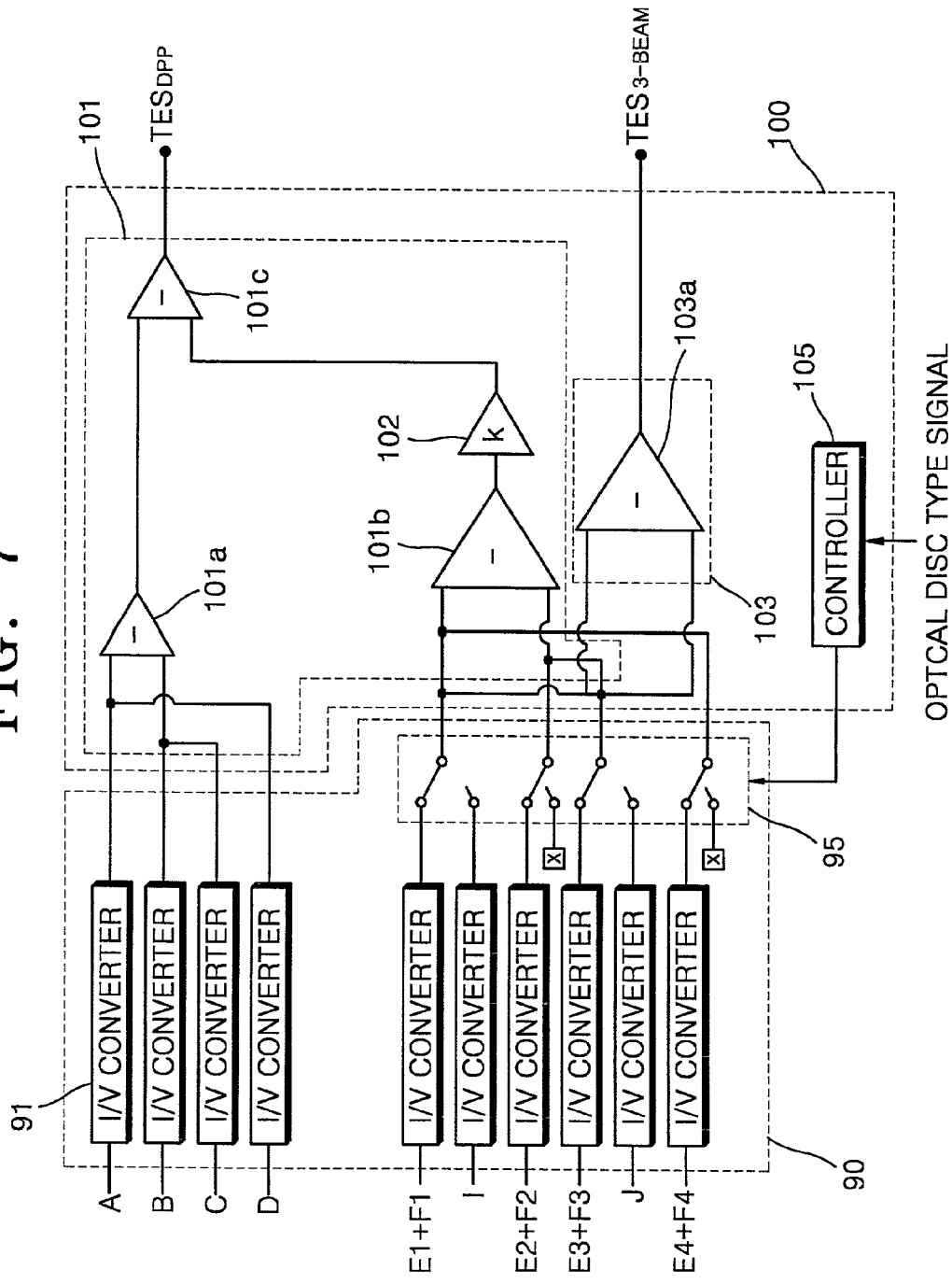
FIG. 7 is a circuit diagram for realizing an optimal tracking servo-control adopted in the optical recording/reproducing apparatus according to embodiment of the present invention shown in FIG. 6.

FIG. 7 shows the structure of a light detection device circuit 90 and the signal processor 100 adopted in the optical recording/reproducing apparatus according to FIG. 6. The light detection device circuit 90 includes a plurality of current-to-voltage (I/V) converters 91 which convert the current signals output from the main photodetector 81 and the first and second sub-photodetectors 83, 85, 87, and 89 into voltage signals and output the converted signals.

As seen from the above Equations 1, in both the improved push-pull method and the improved astigmatism method, since the detection signals of each pair of the section E1 and F1, E2 and F2, E3 and F3, and E4 and F4 are summed, the light detection device circuit 90 outputs current signals from each pair of the section E1 and F1, E2 and F2, E3 and F3, and E4 and F4 that are summed and converted into voltage signals using the current-to-voltage converters 91.

Since the three-beam method and the improved push-pull method are selectively used in the optical recording/reproducing apparatus according to the embodiment of FIG. 6, the light detection device circuit 90 further includes a switch 95 which selectively outputs the detection signals of the first sub-photodetectors 83 and 85 and the second sub-photodetectors 87 and 89.

With the light detection device circuit 90 shown in FIG. 7, the number of output terminals of a light detection device circuit can be minimized.

The signal processor 100 of FIG. 7 includes a first detection portion 101 which detects a tracking error signal from detection signals of the $0^{th}$ order beam and the $\pm 2^{nd}$ order beams in the improved push-pull method, and a second detection portion 103 which detects a tracking error signal from detection signals of the $\pm 1^{st}$ order beams in the three-beam method.

The signal processor 100 further includes a controller 105 which controls the switch 95 of the light detection device circuit 90 to detect a tracking error signal by selectively using one of the improved push-pull method and the three-beam method. The controller 105 controls the switch 95 by using an optical disc type signal detected by the optical recording/reproducing apparatus.

The first detection portion 101 includes first, second and third differentiators 101a, 101b, and 101c, and a gain adjuster 102. The first differentiator 101a receives detection signals that are output from the four sections A, B, C, and D of the main photodetector 81 (FIG. 6), which receive the $0^{th}$ order beam. Detection signals from A, B, C and D are converted into current-to-voltage signals, and further output as a first push-pull signal. Detection signals of the sections A and D which are arranged in a direction corresponding to a tangential direction of the optical disc 30 (hereinafter, called a direction T) are input to one input terminal of the first differentiator 101a, while the detection signals form the other sections B and C are input to the other input terminal of the first differentiator 101a. The second differentiator 101b receives other detection signals that are output from the four sections E1, E2, E3, and E4 and F1, F2, F3, and F4 of the second sub-photodetectors 87 and 89, which receive the $\pm 2^{nd}$ order beams. They are also converted into current-to-voltage signals, and output as a second push-pull signal. Detection signals of the sections E1, E4, F1, and F4 of the second sub-photodetectors 87 and 89, which are arranged in the direction T, are input to one input terminal of the second differentiator 101b. Detection signals of the other sections E2, E3, F2, and F3 of the second sub-photodetectors 87 and 89 are input to the other input terminal of the second differentiator 101b. The second push-pull signal is amplified by the gain adjuster 102 up to a predetermined gain k. The third differentiator 101c receives and differentiates the first push-pull signal and the amplified second push-pull signal and outputs a tracking error signal $TES_{DPP}$ in the improved push-pull method. Here, the gain adjuster 102 adjusts the gain of the second push-pull signal so as to optimize the tracking error signal $TES_{DPP}$ in the improved push-pull method. The gain of the gain adjuster 102 can be controlled by the controller 105.

The second detection portion 103 includes a differentiator 103a which receives and differentiates the detection signals that are output from the first sub-photodetectors 83 and 85, which receive the $\pm 1^{st}$ order beams, and are converted into current-to-voltage signals. The differentiator 103a outputs a tracking error signal $TES_{3\text{-}BEAM}$ in the three-beam method.

The controller 105 controls the switch 95 according to the type of the optical disc 30 so as to have the first detection portion 101 output the tracking error signal $TES_{DPP}$ in the improved push-pull method where the optical disc 30 is a predetermined optical disc capable of recording at least once, and so as to have the second detection portion 103 output the tracking error signal $TES_{3\text{-}BEAM}$ in the three-beam method where the optical disc 30 is a predetermined reproduction-only optical disc. Thus, the optical recording/reproducing apparatus according to the present invention can realize the tracking servo-control in an optimal method according to the type of the optical disc 30.

For example, with a CD-ROM as the optical disc 30, the controller 105 operates the switch 95 of the light detection device circuit 90 so as to input the detection signals from the first sub-photodetectors 83 and 85 to the second detection portion 103. Accordingly, the second detection portion 103 outputs the tracking error signal $TES_{3\text{-}BEAM}$ in the three-beam method. In this case, no signal is output from the first detection portion 101.

In contrast, with one of a CD-R/RW and a DVD-R/RW/RAM as the optical disc 30, the controller 105 operates the switch 95 so as to input the detection signals from the main photodetector 81 and the second sub-photodetectors 87 and 89 to the first detection portion 101. Accordingly, the first detection portion 101 outputs the tracking error signal $TES_{DPP}$ in the improved push-pull method.

A structure which detects a tracking error signal in a differential phase detection method by using the detection signals of the main photodetector 81 in response to the optical disc 30 which comprises a DVD-ROM, may be further included.

In the optical recording/reproducing apparatus according to the embodiment of FIGS. 6 and 7, the light beam emitted from the first light source 31 is split into a main light beam and at least four sub-light beams which are symmetrical with respect to the main light beam. The split light beams land on the optical disc 30. The main light beam and the sub-light beams reflected by the optical disc 30 are detected by the main photodetector 81, the first sub-photodetectors 83 and 85, and the second sub-photodetectors 87 and 89 which can concurrently detect tracking error signals in the three-beam method and the improved push-pull method. The signal processor 100 selectively detects a tracking error signal in one of the improved push-pull method and the three-beam method according to the type of the optical disc 30 by using detection signals of the main light beam and/or sub-light beams. Here, the controller 105 of the signal processor 100 selects a tracking error signal detection method according to an optical disc type signal and operates the switch 95 of the light detection device circuit 90 so as to detect a tracking error signal in the selected method. Thus, a tracking error signal $TES_{DPP}$ in the improved push-pull method is output by the first detection portion 101 with respect to an optical disc capable of recording at least one time or repeatedly, while a tracking error signal $TES_{3\text{-}BEAM}$ in the three-beam method is output by the second detection portion 103 with respect to an reproduction-only optical disc.

According to the above-described optical recording/reproducing apparatus, the optimal tracking servo-control can be realized by changing a tracking servo-control method according to the type of the optical disc 30.

Although the switch 95 is provided with the light detection device circuit 90 in the embodiment of FIG. 7, the light detection device circuit 90 may be formed without the switch 95. In other words, to change the tracking servo-control method, the signal processor 100 may include a switch (not shown) controlled by the controller 105 at one of the output terminals of the first and second detection portions 101 and 103, and between the light detection device circuit 90 and the first and second detection portions 101 and 103.

The present invention is not limited to an optical recording/reproducing apparatus comprising the optical splitting device 40 which splits the light beam emitted from the first light source 31 into the main light beam and the at least four sub-light beams, and the light detection device 80 having a corresponding structure so as to detect the tracking error signal in the improved push-pull method and the three-beam method.

That is, an optical recording/reproducing apparatus according to the present invention may be formed so as to detect a tracking error signal in the push-pull method and the three-beam method. In this case, a diffraction device for diffracting incident light beam into the $0^{th}$ order beam and the $\pm 1^{st}$ order beams may be provided as the optical splitting device 40 so as to split the light beam emitted from the first light source 31 into the main light beam and at least two sub-light beams.

Figure 8:
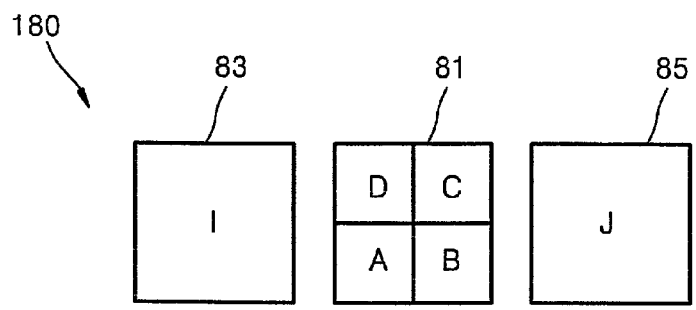
FIG. 8 is a view showing a photodetector device adopted in an optical recording/reproducing apparatus according to another embodiment of the present invention.

FIG. 8 shows a light detection device 180 adopted in an optical recording/reproducing apparatus according to another embodiment of the present invention. The light detection device 180 comprises the same structure as the light detection device 80 shown in FIG. 6, except the second sub-photodetectors 87 and 89 of FIG. 6 are omitted in the light detection device 180.

Figure 9:
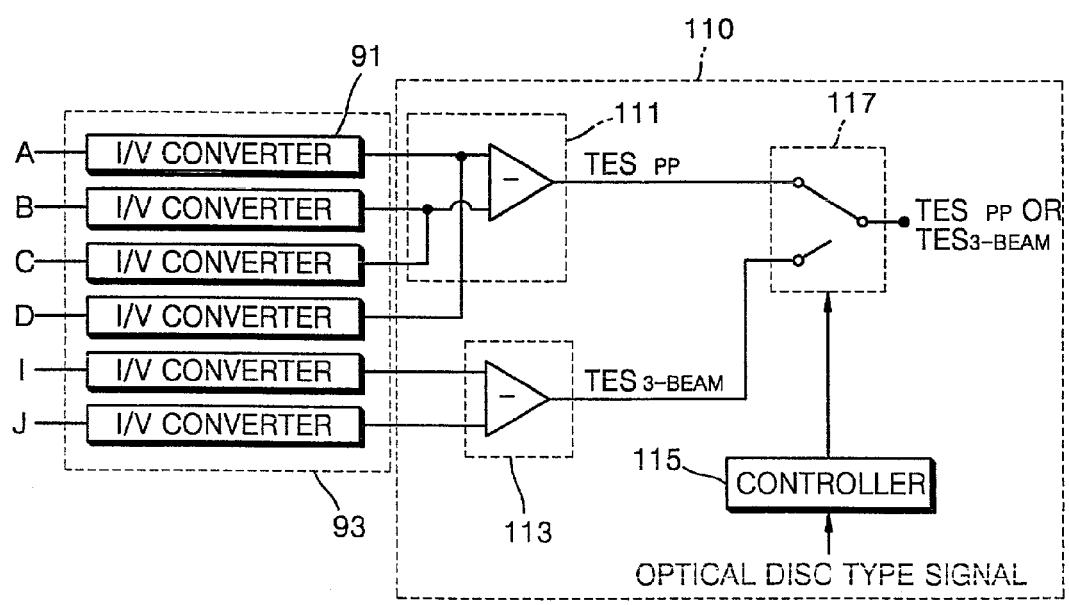
FIG. 9 is a circuit diagram for realizing the optimal tracking servo-control adopted in the optical recording/reproducing apparatus according to embodiment of the present invention shown in FIG. 8.

FIG. 9 shows the structure of a light detection device circuit 93 and a signal processor 110 adopted in the optical recording/reproducing apparatus according to FIG. 8. The light detection device circuit 93 includes current-to-voltage converters 91 which convert current signals output from the main photodetector 81 and the first sub-photodetectors 83 and 85 into voltage signals. The signal processor 110 includes a first detection portion 111 which comprises a single differentiator to detect a tracking error signal from detection signals of the four sections A, B, C and D of the main photodetector 81 in the push-pull method, and a second detection portion 113 which comprises a single differentiator to detect a tracking error signal from detection signals of the first sub-photodetectors 83 and 85 in the three-beam method.

The signal processor 110 further includes a switch 117 installed at output terminals of the first and second detection portions 111 and 113, and a controller 115 which controls the switch 117 according to the type of an optical disc. Thus, the optical recording/reproducing apparatus according to FIGS. 8 and 9 can select a tracking servo-control method according to the type of an optical disc.

The switch 117 may be installed between the light detection device circuit 93, and the first and second detection portions 111 and 113.

The tracking error signals $TES_{3\text{-}BEAM}$ in the three-beam method and $TES_{PP}$ in the push-pull method resulting from the optical recording/reproducing apparatus according to FIGS. 8 and 9 are expressed as shown in Equations 2.

$$TES_{3\text{-}BEAM} = I - J$$

$$TES_{PP} = ((A+D)-(B+C)) \quad \text{Equations 2}$$

An example of an optical pickup adopted in the optical recording/reproducing apparatus according to the present invention will now be described with reference to FIG. 4.

The first light source 31 emits a light beam having, for example, a wavelength of 780 nm appropriate for recording and/or reproducing data on a CD-family optical disc. The optical system, as shown in FIG. 4, includes a first optical path changing device 53, for example, a cubic type beam splitter, and an objective lens 61 which condenses a main light beam and sub-light beams split by the optical splitting device 40 and focuses the condensed light beams on the optical disc 30. The optical system may further include a first collimating lens 59 which collimates the light beams to the objective lens 61.

The optical pickup further includes a second light source 71 which emit a light beam having, for example, a wavelength of 650 nm so as to have compatibility with a DVD-family optical disc having a thickness different from that of the CD-family optical disc. Here, the optical system further includes a second optical path changing device 75, for example, a plate type beam splitter, which changes an optical path of the light beam emitted from the second light source 71.

The first collimating lens 59 is arranged between the objective lens 61 and the first optical path changing device 53 so as to collimate the light beam emitted from the first and second light sources 31 and 71.

Meanwhile, to improve the efficiency of the light beam emitted from the first light source 31, which lands on the optical disc 30, the optical pickup further includes a second collimating lens 51 disposed along an optical path between the first light source 31 and the first optical path changing device 53. With the second collimating lens 51 inserted along the optical path of the light beam emitted from the first light source 31, the focal length of the entire system of a collimating lens can be made short without changing the configuration of the other optical system with respect to the light beam emitted from the first light source 31. Therefore, the efficiency of the light beam emitted from the optical disc 30 can be further improved. For example, when the focal length of the first collimating lens 59 is 25 mm, the total focal length of the collimating system can be reduced to 12.5 mm by inserting the second collimating lens 51 having the focal length of 13 mm. Thus, the efficiency of the light beam emitted from the first light source 31, which lands on the optical disc 30, can be improved so as to effectively record information on the optical disc 30 that is a rewritable optical disc such as a CD-RW.

A grating 73 which diffracts the light beam emitted from the second light source 71 into the $0^{th}$ order beam and the $\pm 1^{st}$ order beams can be further provided between the second light source 71 and the second optical path changing device 75 to perform a focus servo-control in an improved astigmatism method during a reproduction of data recorded on a DVD-family optical disc.

In FIG. 4, reference numeral 55 denotes a front photodetector which selectively monitors outputs of the first and second light sources 31 and 71, reference numeral 57 denotes a reflection mirror, and reference numeral 63 denotes an adjustment lens disposed between the objective lens 61 and the light detection device 80. The adjustment lens 63 makes a focus error signal detected by adjusting astigmatism of a beam input to a light receiving portion.

The optical recording/reproducing apparatus according to the present invention adopting an optical pickup having the optical configuration as shown in FIG. 4 can realize an optimal tracking servo-control according to the type of a CD-family optical disc during a reproduction of data recorded on the CD-family optical disc. Also, the optical recording/reproducing apparatus of the present invention can reproduce information recorded on CD-family and DVD-family optical discs with beams emitted from the first and second light sources 31 and 71, and can record information on a rewritable disc such as a CD-RW with a beam emitted from the first light source 31.

In addition, as the grating 73 is formed to function as the optical splitting device 40, the optical recording/reproducing apparatus according to the present invention can realize the optimal tracking servo-control during a reproduction of data recorded on a DVD-family optical disc.

Although the light detection device circuit and the signal processor of the optical recording/reproducing apparatus according to the present invention are described as being configured as shown in FIGS. 7 and 9, they are not limited thereto and can be modified in various ways within the scope of the technical concept of the present invention.

Also, FIG. 4 shows an example of an optical configuration of an optical pickup of the present invention and is not limited to such an optical configuration. For example, the optical recording/reproducing apparatus according to the present invention which adopts an optical pickup having a single light source having a wavelength of 780 nm or 650 nm can be applied to an apparatus which records and/or reproduces data on a CD-family optical disc such as a CD-RW or an apparatus which records and/or reproduces data on a DVD-family optical disc such as a DVD-RAM, respectively.

In addition, the optical recording/reproducing apparatus according to the present invention may be configured so as to have the first light source 31 emit light having a wavelength of 650 nm and the second light source 71 emit light having a wavelength of 780 nm. Such recording/reproducing apparatus realizes the optimal tracking servo-control according to the type of a DVD-family optical disc during a reproduction of data from the DVD-family optical disc. Therefore, the optical recording/reproducing apparatus of the present invention can be applied so as to reproduce information recorded on DVD-family and CD-family optical discs with light emitted from the first and second light sources 31 and 71 and/or record information on a recordable optical disc such as a DVD-R/RW/RAM with the light emitted from the first light source 31.

As described above, an optical recording/reproducing apparatus according to the present invention may selectively use one of an improved push-pull method, a push-pull method and a three-beam method according to the type of an optical disc. Therefore, an optimal tracking servo-control can be realized regardless of the depth of a pit in an optical disc during a reproduction of data from the optical disc, such as a non-rewritable optical disc.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical recording and reproducing apparatus, comprising:
   an optical pickup including
      an optical splitting device which splits light emitted from a first light source into a source main light beam and at least four sub-light beams which are symmetrical with respect to the main light beam, and irradiates the split source main and sub-light beams on a recording medium, and
      a light detection device which receives a reflected main light beam and reflected sub-light beams reflected by the recording medium, and outputs detection signals corresponding to the received reflected main and sub-light beams, so as to detect tracking error signals in a three-beam method and at least one of a push-pull method and an improved push-pull method; and
   a signal processor which receives the detection signals output by the light detection device and detects a first tracking error signal in the three-beam method and a second tracking error signal in one of the push-pull method and the improved push-pull method,
   wherein the sub-light beams which are symmetrical with respect to the main light beam comprise first two sub-light beams and second two sub-light beams, the first two sub-light beams being closer to the main light beam than the second two sub-light beams,
   wherein the signal processor comprises:
      a first detection portion which detects the tracking error signal in the push-pull method or the improved push-pull method from second detection signals of the second two sub-light beams and main detection signals of the main light beam; and
      a second detection portion which detects the tracking error signal in the three-beam method from first detection signals of the first two sub-light beams, and wherein the light detecting device includes a switch selectively outputting the first and second detection signals to the first and second detecting portions, respectively.

2. The apparatus as claimed in claim 1, wherein the optimal tracking servo-control is realized by using the tracking error signal in the three-beam method in response to the recording medium being a reproduction-only recording medium, and using the tracking error signal in one of the push-pull method and the improved push-pull method in response to the recording medium being a recording medium that can be recorded on at least once, according to a recording medium type signal detected by the optical recording and reproducing apparatus.

3. The apparatus as claimed in claim 2, wherein
the sub-light beams comprise first two sub-light beams and second two sub-light beams, and
the light detection device comprises:
a main photodetector which detects the main light beam;
first sub-photodetectors which receive corresponding ones of the first two sub-light beams, wherein the first two sub-light beams are closer to the main light beam than the second two sub-light beams; and
second sub-photodetectors which receive corresponding ones of the second two sub-light beams.

4. The apparatus as claimed in claim 2, further comprising a light detection device circuit including a current-to-voltage converting unit which converts each of current signals output from the light detection device into a corresponding one of voltage signals and outputs each of the converted voltage signals as a corresponding one of the detection signals.

5. The apparatus as claimed in claim 2, wherein the optical splitting device comprises a diffracting device which diffracts the light emitted from the first light source into $0^{th}$ order, $\pm 1^{st}$ order, and $\pm 2^{nd}$ order diffracted light beams.

6. The apparatus as claimed in claim 2, wherein the sub-light beams comprises first two sub-light beams which are closest to the main light beam and have a phase difference of about 180° with respect to each other.

7. The apparatus as claimed in claim 2, wherein the optical pickup further comprises:
a first optical path changing device which changes a proceeding path of an incident light; and
an objective lens which condenses the main light beam and the sub-light beams split by the optical splitting device, and focuses the condensed main and sub-light beams on the recording medium.

8. The apparatus as claimed in claim 2, wherein the optical pickup further comprises a second light source which emits light having a wavelength different from that of the light emitted from the first light source, wherein the light emitted from the second light source land on the recording medium, so as to compatibly adopt to recording media having different formats.

9. The apparatus as claimed in claim 1, wherein the signal processor further comprises:
a controller which controls the switch by using the recording medium type signal so as to detect the tracking error signal with one of the first and second detection portions.

10. The apparatus as claimed in claim 9, wherein the controller detects the tracking error signal in the three-beam method in response to the recording medium being the reproduction-only recording medium, and detects the tracking error signal in the improved push-pull method in response to the recording medium being the recording medium which can be recorded on at least once, according to the recording medium type signal detected by the optical recording and reproducing apparatus.

11. The apparatus as claimed in claim 9, further comprising a light detection device circuit including a current-to-voltage converting unit which converts each of current signals output from the light detection device into a corresponding one of voltage signals and outputs each of the converted voltage signals as a corresponding one of the main, first and second detection signals.

12. The apparatus as claimed in claim 9, wherein the optical splitting device comprises a diffracting device which diffracts the light emitted from the first light source into $0^{th}$ order $\pm 1^{st}$ order, and $\pm 2^{nd}$ order diffracted light beams.

13. The apparatus as claimed in claim 9, wherein the first two sub-light beams and have a phase difference of about 180° with respect to each other.

14. The apparatus as claimed in claim 9, wherein the optical pickup further comprises:
a first optical path changing device which changes a proceeding path of an incident light; and
an objective lens which condenses the main and sub-light beams split by the optical splitting device, and focuses the condensed main and sub-light beams on the recording medium.

15. The apparatus as claimed in claim 1, wherein the signal processor further comprises:
a controller which controls the switch so as to have one of the first and second detection portions detect the tracking error signal.

16. The apparatus as claimed in claim 15, wherein the controller detects the tracking error signal in the three-beam method in response to the recording medium being a reproduction-only recording medium and the tracking error signal in the improved push-pull method in response to the recording medium being a recording medium which can be recorded on at least once, according to a recording medium type signal detected by the optical recording and reproducing apparatus.

17. The apparatus as claimed in claim 15, further comprising a light detection device circuit including a current-to-voltage converting unit which converts each of current signals output from the light detection device into a corresponding one of voltage signals and outputs each of the converted voltage signals as a corresponding one of the main, first and second detection signals.

18. The apparatus as claimed in claim 15, wherein the optical splitting device comprises a diffracting device which diffracts the light emitted from the first light source into $0^{th}$ order, $\pm 1^{st}$ order, and $\pm 2^{nd}$ order diffracted light beams.

19. The apparatus as claimed in claim 15, wherein the first two sub-light beams and have a phase difference of about 180° with respect to each other.

20. The apparatus as claimed in claim 15, wherein the optical pickup further comprises:
a first optical path changing device which changes a proceeding path of an incident light; and
an objective lens which condenses the main and sub-light beams split by the optical splitting device, and focuses the condensed main and sub-light beams on the recording medium.

21. The apparatus as claimed in claim 1, wherein
the sub-light beams comprise first two sub-light beams and second two sub-light beams, and
the light detection device comprises:

a main photodetector which detects the main light beam;
first sub-photodetectors which receive corresponding ones of the first two sub-light beams, wherein the first two sub-light beams are closer to the main light beam than the second two sub-light beams; and
second sub-photodetectors which receive corresponding ones of the second two sub-light beams.

22. The apparatus as claimed in claim 21, wherein
the main photodetector comprises of a plurality of sections, and
each of the second sub-photodetectors comprises of one of two sections and four sections.

23. The apparatus as claimed in claim 21, further comprising a light detection device circuit including:
a current-to-voltage converting unit which converts each of current signals output from the main photodetector and the first and second sub-photodetectors into a corresponding one of voltage signals, and outputs each of the converted voltage signals as a corresponding one of the detection signals; and
a switch which selectively outputs each of the detection signals from a corresponding one of the first and second sub-photodetectors.

24. The apparatus as claimed in claim 23, wherein the signal processor detects the tracking error signal selectively in one of the improved push-pull method and the three-beam method, and outputs the detected tracking error signal, by controlling the switch according to a recording medium type signal of the optical recording and reproducing apparatus.

25. The apparatus as claimed in claim 1, wherein the light detection device comprises:
a main photodetector which detects the main light beam;
first sub-photodetectors which receive corresponding ones of the first two sub-light beams; and
second sub-photodetectors which receive corresponding ones of the second two sub-light beams.

26. The apparatus as claimed in claim 1, wherein the light detection device comprises:
a main photodetector which detects the main light beam;
first sub-photodetectors which receive corresponding ones of the first two sub-light beams; and
second sub-photodetectors which receive corresponding ones of the second two sub-light beams.

27. The apparatus as claimed in claim 1, further comprising a light detection device circuit including a current-to-voltage converting unit which converts each of current signals output from the light detection device into a corresponding one of voltage signals and outputs each of the converted voltage signals as a corresponding one of the detection signals.

28. The apparatus as claimed in claim 1, further comprising a light detection device circuit including a current-to-voltage converting unit which converts each of current signals output from the light detection device into a corresponding one of voltage signals and outputs each of the converted voltage signals as a corresponding one of the main, first and second detection signals.

29. The apparatus as claimed in claim 1, further comprising a light detection device circuit including a current-to-voltage converting unit which converts each of current signals output from the light detection device into a corresponding one of voltage signals and outputs each of the converted voltage signals as a corresponding one of the main, first and second detection signals.

30. The apparatus as claimed in claim 1, wherein the optical splitting device comprises a diffracting device which diffracts the light emitted from the first light source into $0^{th}$ order $\pm 1^{st}$ order, and $\pm 2^{nd}$ order diffracted light beams.

31. The apparatus as claimed in claim 30, wherein the diffracting device performs diffraction so as to have a diffraction ratio between the $0^{th}$ order, the $\pm 1^{st}$ order, and the $\pm 2^{nd}$ order diffracted light beams that is substantially 8-16: 0.3-2.3:0.3-2.3, and a total diffraction efficiency of the $0^{th}$ order, the $\pm 1^{st}$ order, and the $\pm 2^{nd}$ order diffracted light beams with respect to an incident light beam that is at least 70%.

32. The apparatus as claimed in claim 1, wherein the optical splitting device comprises a diffracting device which diffracts the light emitted from the first light source into $0^{th}$ order $\pm 1^{st}$ order, and $\pm 2^{nd}$ order diffracted light beams.

33. The apparatus as claimed in claim 1, wherein the optical splitting device comprises a diffracting device which diffracts the light emitted from the first light source into $0^{th}$ order $\pm 1^{st}$ order, and $\pm 2^{nd}$ order diffracted light beams.

34. The apparatus as claimed in claim 1, wherein the sub-light beams comprises first two sub-light beams which are closest to the main light beam and have a phase difference of about 180° with respect to each other.

35. The apparatus as claimed in claim 1, wherein the first two sub-light beams and have a phase difference of about 180° with respect to each other.

36. The apparatus as claimed in claim 1, wherein the first two sub-light beams and have a phase difference of about 180° with respect to each other.

37. The apparatus as claimed in claim 1, wherein the optical pickup further comprises:
a first optical path changing device which changes a proceeding path of an incident light; and
an objective lens which condenses the main light beam and the sub-light beams split by the optical splitting device, and focuses the condensed main and sub-light beams on the recording medium.

38. The apparatus as claimed in claim 37, wherein the optical pickup further comprises an adjustment lens which adjusts astigmatism of light reflected by the recording medium.

39. The apparatus as claimed in claim 38, wherein the sub-light beams comprises first two sub-light beams and second two sub-light beams, and
the light detection device comprises:
a main photodetector which detects the main light beam;
first photodetectors which receive corresponding ones of the first two sub-light beams, wherein the first two sub-light beams are closer to the main light beams than the second two sub-light beams; and
second photodetectors which receive corresponding ones of the second two sub-light beams, wherein each of the second sub-photodetectors of the optical pickup comprises of four sections so as to detect a focus error signal in an improved astigmatism method, wherein the improved astigmatism (d-FES) is determined according to:

$$d\text{-}FES=((A+C)-(B+D))-k'(\{(E1+F1)+(E3+F3)\}-\{(E2+F2)+(E4+F4)\})$$

where A, B, C and D are main detection signals from the main photodetector, E1, E2, E3, E4, F1, F2, F3 and F4 are second detection signals from the second photodetectors, and k' is a gain applied to the second detection signals.

40. The apparatus as claimed in claim 37, wherein the optical pickup further comprises:

a second light source which emits light having a wavelength different from that of the light from the first light source; and a second optical path changing device which irradiates the light emitted from the second light source toward the recording medium, so as to compatibly adopt to recording media having different formats.

41. The apparatus as claimed in claim 40, further comprising a first collimating lens which collimates the light emitted from the first and second light sources.

42. The apparatus as claimed in claim 41, further comprising a second collimating lens which is situated between the first light source and the first collimating lens.

43. The apparatus as claimed in claim 40, wherein one of the first and second light sources emits light having a wavelength appropriate for recording and reproducing information with respect to a CD-family recording medium and the other light source emits light having a wavelength appropriate for recording and reproducing information with respect to a DVD-family recording medium.

44. The apparatus as claimed in claim 1, wherein the optical pickup further comprises:

a first optical path changing device which changes a proceeding path of an incident light; and an objective lens which condenses the main and sub-light beams split by the optical splitting device, and focuses the condensed main and sub-light beams on the recording medium.

45. The apparatus as claimed in claim 1, wherein the optical pickup further comprises:

a first optical path changing device which changes a proceeding path of an incident light; and an objective lens which condenses the main and sub-light beams split by the optical splitting device, and focuses the condensed main and sub-light beams on the recording medium.

46. A method of detecting a tracking error signal in an optical recording and reproducing apparatus, the method comprising:

splitting light emitted from a light source into a source main light beam and at least four source sub-light beams which are symmetrical with respect to the main light beam;

irradiating the source split light beams on a recording medium;

detecting a reflected main light beam and reflected sub-light beams reflected by the recording medium; and detecting a first tracking error signal in a three-beam method and a second tracking error signal in one of a push-pull method and an improved push-pull method, wherein the sub-light beams which are symmetrical with respect to the main light beam comprise first two sub-light beams and second two sub-light beams, the first two sub-light beams being closer to the main light beam than the second two sub-light beams, wherein the detecting of the first and second tracking error signals is effected by a signal processor comprising:

a first detection portion which detects the tracking error signal in the push-pull method or the improved push-pull method from second detection signals of the second two sub-light beams and main detection signals of the main light beam; and a second detection portion which detects the tracking error signal in the three-beam method from first detection signals of the first two sub-light beams, and wherein, in the detecting a main light beam and reflected sub-light beams, first and second detection signals are selectively output to the first and second detecting portions, respectively.

47. The method as claimed in claim 46, wherein the detecting of the tracking error signal comprises:

selecting a tracking servo-control method including one or a combination of the three-beam method, the push-pull method and the improved push-pull method according to a recording medium type signal detected by the optical recording and reproducing apparatus; and detecting the tracking error signal according to the selected tracking servo-control method.

48. The method as claimed in claim 47, wherein, the detecting of the tracking error signal comprises:

using the recording medium type signal detected by the optical recording and reproducing apparatus; and detecting the tracking error signal in the three-beam method in response to the recording medium being a reproduction-only recording medium, and detecting the tracking error signal in one of the push-pull method and the improved push-pull method in response to the recording medium being a recording medium which can be recorded on at least once.

49. The method as claimed in claim 46, wherein, the detecting of the tracking error signal comprises:

using a recording medium type signal detected by the optical recording and reproducing apparatus; and detecting the tracking error signal in the three-beam method in response to the recording medium being a reproduction-only recording medium, and detecting the tracking error signal in one of the push-pull method and the improved push-pull method in response to the recording medium being a recording medium which can be recorded on at least once.

50. An optical recording and reproducing apparatus comprising:

an optical pickup including an optical splitting device which splits a light into a main light beam and at least four sub-light beams which are symmetrical with respect to the main light beam, and irradiates the split source main and source sub-light beams, the sub-light beams include first two sub-light beams and second two sub-light beams, the first two sub-light beams being closer to the main light beam than the second two sub-light beams, and a light detection device which receives reflected main and reflected sub-light beams reflected from a recording medium, outputs detection signals corresponding to the received reflected main and reflected sub-light beams, and includes a switch selectively outputting a first detection signal and a second detection signal; and a signal processor which receives the detection signals, detects a first tracking error signal in a three-beam method and a second tracking error signal in a push-pull method or an improved push-pull method, and includes a first detection portion which detects the tracking error signal in the push-pull method or the improved push-pull method from the second detection signals of the second two sub-light beams and main detection signals of the main light beam; and a second detection portion which detects the tracking error signal in the three-beam method from the first detection signals of the first two sub-light beams, and wherein the first and second detection signals are respectively output to the first and second detecting portions.

51. The apparatus as claimed in claim 50, wherein the signal processor detects the tracking error signal in the three-beam method in response to the recording medium which comprises a reproduction-only recording medium, and in one of the push-pull method and the improved push-pull method in response to the recording medium which comprises a recordable recording medium, according to the recording medium type signal detected by the optical recording and reproducing apparatus.

52. The apparatus as claimed in claim 51, wherein the optical pickup further comprises a second light source which emits a second light having a wavelength different from that of the light from the first light source, wherein the second light is irradiated on the recording medium so as allow the optical recording and reproducing apparatus to compatibly adopt to recording media having different formats.

* * * * *

UNITED STATES PATENT AND TRADEMARK OFFICE
CERTIFICATE OF CORRECTION

PATENT NO.        : 7,283,440 B2                                              Page 1 of 1
APPLICATION NO.   : 10/073061
DATED             : October 16, 2007
INVENTOR(S)       : Kun-soo Kim et al.

It is certified that error appears in the above-identified patent and that said Letters Patent is hereby corrected as shown below:

First Page, Column 2 (FOREIGN PATENT DOCUMENTS), under "JP   64-50243   2/1989" insert --JP      11-213405      8/1999--.

Column 14, Line 15, change "order $\pm 1^{St}$" to --order, $\pm 1^{st}$--.

Column 16, Line 2, change "order $\pm 1^{St}$" to --order, $\pm 1^{st}$--.

Column 16, Line 14, change "order $\pm 1^{St}$" to --order, $\pm 1^{st}$--.

Column 16, Line 18, change "order $\pm 1^{St}$" to --order, $\pm 1^{st}$--.

Signed and Sealed this

Seventh Day of October, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,283,440 B2 |
| APPLICATION NO. | : 10/073061 |
| DATED | : October 16, 2007 |
| INVENTOR(S) | : Kun-soo Kim et al. |

Page 1 of 1

It is certified that error appears in the above-identified patent and that said Letters Patent is hereby corrected as shown below:

First Page, Column 2 (FOREIGN PATENT DOCUMENTS), under "JP   64-50243   2/1989" insert --JP       11-213405       8/1999--.

Column 14, Line 15, change "order $\pm 1^{st}$" to --order, $\pm 1^{st}$--.

Column 16, Line 2, change "order $\pm 1^{st}$" to --order, $\pm 1^{st}$--.

Column 16, Line 14, change "order $\pm 1^{st}$" to --order, $\pm 1^{st}$--.

Column 16, Line 18, change "order $\pm 1^{st}$" to --order, $\pm 1^{st}$--.

Column 20, Line 11, after claim 52 insert
       --53. The apparatus as claimed in claim 1, wherein the optical pickup further comprises a second light source which emits light having a wavelength different from that of the light emitted from the first light source, wherein the light emitted from the second light source land on the recording medium, so as to compatibly adopt to recording media having different formats.--.

This certificate supersedes the Certificate of Correction issued October 7, 2008.

Signed and Sealed this

Thirtieth Day of December, 2008

JON W. DUDAS
*Director of the United States Patent and Trademark Office*